US007370517B2

(12) United States Patent
Rupp et al.

(10) Patent No.: US 7,370,517 B2

(45) Date of Patent: May 13, 2008

(54) METHOD OF OPERATING AN INTERNAL COMBUSTION ENGINE BY DETERMINING ANGULAR POSITIONS OF A CRANKSHAFT AND CAMSHAFT

(75) Inventors: Ingolf Rupp, Kornwestheim (DE); Bernd Kesch, Hemmingen (DE); Christof Thiel, Heilbronn (DE); Juergen Foerster, Ingersheim (DE); Tae Jeon Kwon, Suwon-si (KR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/847,937

(22) Filed: May 18, 2004

(65) Prior Publication Data

US 2004/0236497 A1 Nov. 25, 2004

(30) Foreign Application Priority Data

May 23, 2003 (DE) ................................ 103 23 486

(51) Int. Cl.
*G01M 15/00* (2006.01)

(52) U.S. Cl. ..................................................... 73/117.3

(58) Field of Classification Search .................. 73/116, 73/117.2, 117.3, 118.1
See application file for complete search history.

(56) References Cited

U.S. PATENT DOCUMENTS 5,621,644 A * 4/1997 Carson et al. .............. 701/102
6,101,993 A * 8/2000 Lewis et al. ............. 123/90.17
6,302,085 B1 * 10/2001 Sekine et al. .......... 123/406.62
6,324,488 B1 * 11/2001 Siegl .......................... 702/151
6,578,550 B1 * 6/2003 Rupp et al. ............ 123/406.13
6,612,162 B2 * 9/2003 Han et al. .................. 73/117.3
6,655,187 B1 * 12/2003 Lehner et al. ............... 73/1.75
6,776,033 B2 * 8/2004 Hori et al. ................. 73/117.3
6,837,100 B1 * 1/2005 Lehner et al. ............. 73/117.3
6,895,931 B2 * 5/2005 Rupp et al. ............ 123/406.18
2002/0092499 A1 * 7/2002 Kargilis et al. ........ 123/406.58
2003/0000498 A1 * 1/2003 Mathews et al. ...... 123/406.62

FOREIGN PATENT DOCUMENTS

| | | |
|---|---|---|
| DE | 40 28 442 | 3/1992 |
| DE | 41 37 527 | 5/1993 |
| DE | 197 50 024 | 5/1999 |
| DE | 100 32 332 | 1/2002 |
| EP | 0 445 555 | 9/1991 |

* cited by examiner

*Primary Examiner*—Eric S. McCall
(74) *Attorney, Agent, or Firm*—Michael J. Striker

(57) ABSTRACT

A method of operating an internal combustion engine in a motor vehicle has the steps of determining angular positions of a crankshaft and a camshaft from signals of two detecting devices, monitoring a relative angular position of one of the shafts relative to the other of the shafts, and, depending on whether a change of the determined actual relative position is located outside the tolerance region, releasing an action, and also a computer program, a storage medium, a control and/or regulating unit, and an internal combustion engine with the use of inventive method are proposed.

8 Claims, 4 Drawing Sheets

METHOD OF OPERATING AN INTERNAL COMBUSTION ENGINE BY DETERMINING ANGULAR POSITIONS OF A CRANKSHAFT AND CAMSHAFT

BACKGROUND OF THE INVENTION

The present invention relates to a method of operating an internal combustion engine, in particular in a motor vehicle.

More particularly, it relates to a method of operating an internal combustion engine, in accordance with which, from the signals of two detecting devices, angular positions of a crankshaft and a camshaft are determined, and in which a relative angular position of one shaft relative to another shaft is monitored.

The invention also relates to a computer program, to an electrical storage medium for a control and/regulating device of an internal combustion engine, to a control and/ regulating device for an internal combustion engine, and to an internal combustion engine.

A method of the above mentioned general type is disclosed for example in the German patent document DE 100 32 332 A1. In this document it is described that for monitoring and diagnosis an association of the angular position of the camshaft of an internal combustion engine to a crankshaft must be tested, whether the signals of a detecting device for detecting the camshaft angle and a detecting device for detecting the crankshaft angle are plausible relative to one another.

Here and later a relative angular position is identified as the angular position of a reference mark on one shaft relative to a reference mark on another shaft. Since the camshaft and the crankshaft are conventionally coupled with one another through a transmission device, the angular positions of the both shafts relative to one another are equal at least in predetermined operational conditions of the internal combustion engine, if the internal combustion engine operates correctly. When a difference between an actual angular position of the camshaft with respect to a nominal angular position exceeds a predetermined threshold, then an action is released. Such a difference can be for example obtained when the detecting devices are positioned erroneously or when an error occurs during the signal processing.

SUMMARY OF THE INVENTION

Accordingly, it is an object of the present invention to provide a method of the above mentioned general type, which avoids the disadvantages of the prior art.

More particularly, it is an object of the present invention to provide a method of the above mentioned general type, which is performed so that the internal combustion engine can operate reliably.

In keeping with these objects and with others which will become apparent hereinafter, one feature of the present invention resides, briefly stated in a method of the above mentioned type, in which, depending on whether a change of the detected actual relative angular position is located outside a tolerance region, an action is released.

In a computer program, this objective is achieved in that it is programmed for the use in a method in accordance with the present invention. In an electrical storage medium this objective is achieved in that a computer program for the use in the inventive method is stored in the storage medium. A control and/regulating device achieves this objective in that it is programmed for the use of the inventive method. In the internal combustion engine, the above mentioned objective is achieved when it includes a control and/or regulating device which is programmed for the use of the inventive method.

When the method is performed in accordance with the present invention, the change of the coupling of one shaft to the other shaft, or in other words a change in the transmission device which couples the camshaft with the crankshaft can be recognized. Thereby the reliability to the operation of the internal combustion engine is increased and damaged of the internal combustion engine in the case of errors can be eliminated. With the inventive method a complete malfunction of the transmission device which couples the both shafts is detectable.

The basis for this is that conventionally the camshaft and the crankshaft of an internal combustion engine are coupled with one another through a mechanical transmission. Such a transmission includes conventionally a control chain or a toothed belt, which is tensioned between corresponding transmission wheels. In the inventive method it is possible to recognize when during the operation of the internal combustion engine the control chain or the toothed belt slips on one of the drive wheels, when the coupling of both shafts changes. This recognition is based on the fact that a tolerance region is provided around the actual relative angular position of the both shafts determined by the detecting devices. It is measured so that when the coupling is clearly changed, for example a control chain or a toothed belt slips by at least one pitch on a corresponding transmission wheel, the relative angular position leaves the tolerance region.

In accordance with another embodiment of the present invention, it is proposed that the release of the action depends on whether the change is performed within a predetermined time period and/or within a predetermined number of revolutions of one of the shafts. The basic consideration is that a sliding of a control chain or a toothed belt or a complete failure of the transmission device which couples the shafts with one another is performed suddenly or at least very fast. Due to this additional feature, such error can be distinguished from slowly occurring errors, for example a drift of a detection device.

It is also proposed that a determined relative angular position the latest at the end of an operational cycle of the internal combustion engine is stored in a non-volatile storage. During a subsequent operational circle of the internal combustion engine, comparison values are available, so that for example also an error during maintenance works on the transmission device, which couples the both shafts, can be recognized. Also, mounting errors of one of the detecting devices must not be taken into consideration with this further feature during the determination of the tolerance region, so that the tolerance region can be relatively narrow. This increases the reliability of the inventive method.

A further advantageous embodiment of the inventive method resides in that a desired relative angular position of the both shafts relative to one another can be changed, and for monitoring an actual relative angular position can be used, which in a specified position, for example in one of the both end positions of the possible adjusting region, is determined. Thereby the application region of the inventive method can be expanded also to such internal combustion engines in which a camshaft adjustment is available.

With such a camshaft adjustment, the relative angular position of the both shafts can be influenced as desired. For determining a relatively narrow tolerance region, only those signals for the above explained monitoring are used, which in a reproducible operational condition, namely in an exactly known position of the adjusting device, are contained in one of the end positions of the adjusting region of the camshaft adjustment.

It is especially advantageous when the determined actual relative angular position is adapted with respect to a nominal value, wherein the adaptation is performed in a time-delayed fashion, for example by means of a low pass filter. The determined actual relative angular position is basically connected with a certain fuzziness, since during their determination tolerances of the transmission which couples the both shafts, the detecting devices and the evaluating devices are mutually influenced. These tolerances include for example a clearance of a control chain or a toothed belt, a mounting error of one of the detecting devices, tolerances of the detecting devices, temperature influences to which the detection devices are subjected, and the like. At least a part of these tolerance influences, namely the static influences are separated in accordance with a further embodiment of the method, by adapting the detected actual relative angular position generally to the nominal value. With this adaptation however there is a danger that the change of the relative angular position no more can be detected correctly. For this reason the adaptation is performed in a time-delayed fashion.

It is first of all proposed that, depending on whether the detected actual angular position is located outside of a tolerance region, an action is released. In this way also a static error of the angular position of the both shafts can be recognized.

It is further advantages when the action or the actions include an inputting in an error storage and/or detected in a rest position of the internal combustion engine. Thereby the maintenance is facilitated and/or a damage to the internal combustion engine is reliably avoided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
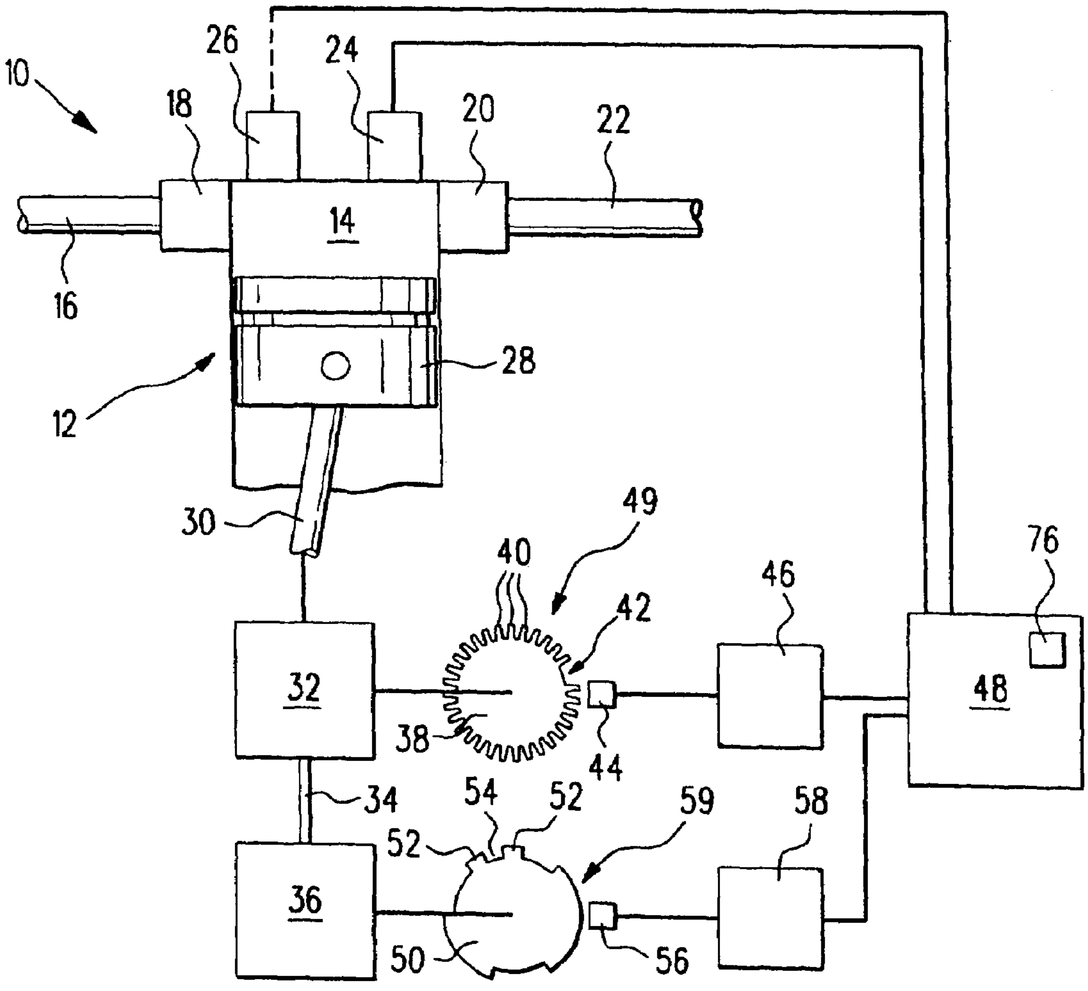
FIG. 1 is a view schematically showing an internal combustion engine with a detecting device for an angular position of a crankshaft and a detecting device for an angular position of a camshaft.

An internal combustion engine is shown in FIG. 1 and identified as a whole with reference numeral 10. It serves for driving a motor vehicle which is not shown in the drawing.

The illustrated internal combustion engine is a four cylinder internal combustion engine. In FIG. 1 only the components of one cylinder are shown, which cylinder is identified with reference numeral 12. The cylinder 12 includes a combustion chamber 14 with an inlet passage 16 and an inlet valve 18 for introducing a combustion air. The hot combustion exhaust gasses are discharged from the combustion chamber 14 through an outlet valve 20 and an outlet passage 22. Fuel is supplied into the combustion chamber 14 directly through an injection device 24, and ignites fuel-air mixture located in the combustion chamber 12 by a spark plug 26. The shown internal combustion engine is a gasoline-direct injection engine. The embodiments of the invention presented herein below are analogously applicable to diesel internal combustion engines as well as to internal combustion engines with a suction pipe injection.

A piston 28 is connected through a connecting rod 30 with a crankshaft 32. The crankshaft 32 is coupled with a camshaft 36 through to a transmission device 34. The transmission device 34 includes several components which are not shown in the drawings, for example a toothed belt and a crankshaft-side as well as a camshaft-side belt wheel, between which the toothed belt is tensioned.

The crankshaft 32 is connected with a pickup disc 38 which rotates angularly synchronously with the crankshaft 32. The pickup disc 38 includes 58 identical angle marks 40 and one gap 42 which corresponds to the angular region between two angle marks 40. The position of the pickup disc 38 is detected by a sensor 44. Its signal is submitted through an input circuit 46 to a control and regulating device 48. The pickup disc 38 and the sensor 44 are parts of a crank angle detecting device 49.

Similarly the camshaft 36 is connected with a pickup disc 50 which rotates angularly synchronously with a camshaft 36. Also angle marks 52 are provided on the pickup disc 50 and separated by gaps 54. The pickup disc 50 is sensed by a sensor 56. Its signal is supplied to an input circuit 58 and finally also to the control and regulating device 48. The pickup disc 50 and the sensor 56 are parts of a cam angle detecting device 59. The control and regulating device 48 controls indirectly (through a not shown ignition device) the spark plugs 26 and the injection device 24.

Figure 2:
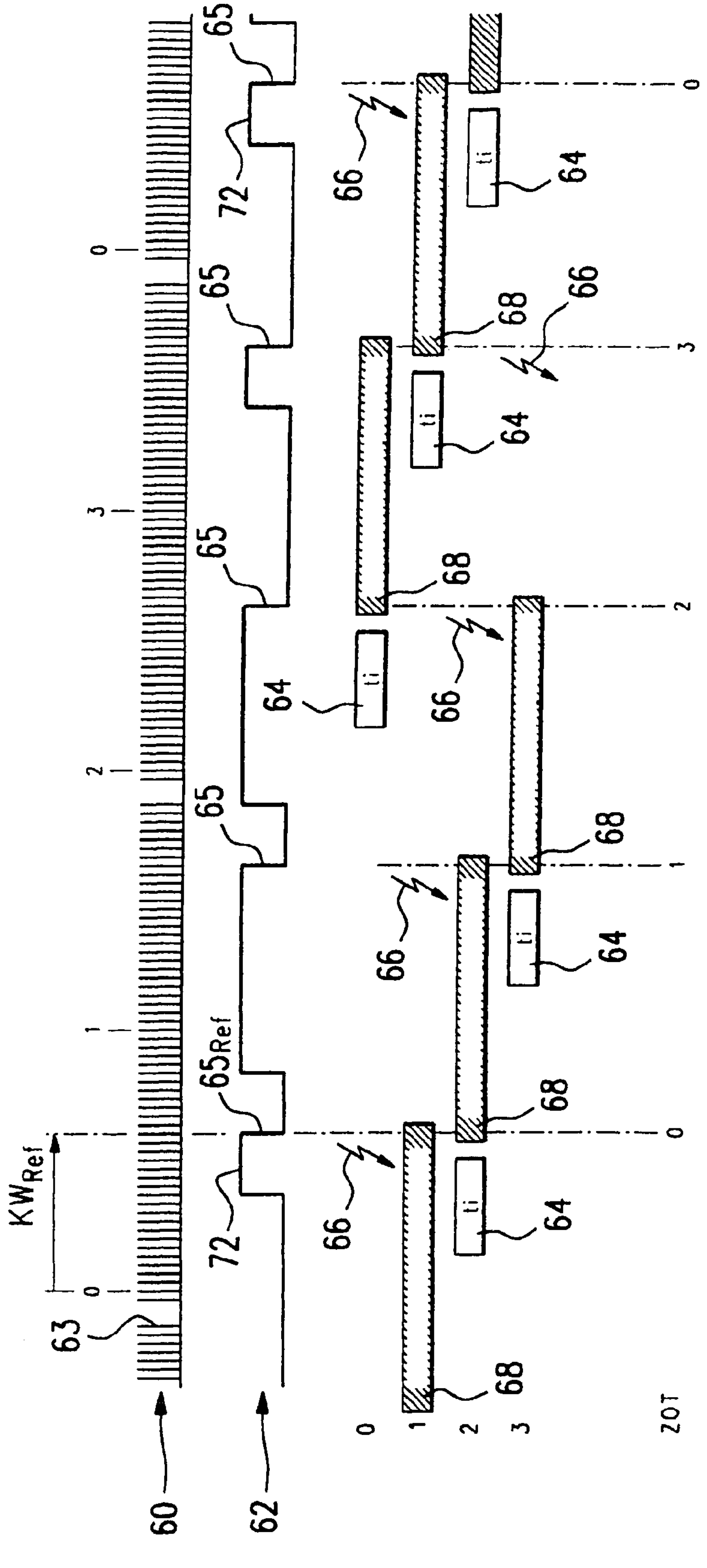
FIG. 2 is a diagram showing the signals of the detecting devices of FIG. 1 as well as the corresponding operational conditions of components of the internal combustion engine of FIG. 1 in operation.

FIG. 2 shows signals which are supplied from the sensors 44 and 56 to the control and regulating device 48. The signal of the sensor 44, with which the pickup disc 38 senses the crankshaft 32 is identified with reference numeral 60, while the signal supplied by the sensor 56 with which the pickup disc 50 senses the camshaft 36 is identified with reference numeral 62. The rotary speed of the crankshaft 32 is determined from the time intervals in this embodiment between the falling signal flanks 63 of the signal 60. A further evaluation is possible for determination of the gaps 42, whose position is represented for a selected position of the crankshaft 32.

For obtaining however a sufficient information about the actual operating clearance of the internal combustion engine, additionally the signal 62 must be evaluated. Since the pickup disc 50 per operating clearance rotates only once, while to the contrary the pickup disc 38 per operating clearance rotates twice, with a corresponding synchronization of the signal 62 with the signal 60, the position of the crankshaft 32 can be clearly defined at the corresponding positions of the piston 28 and the operating condition of the cylinder 12 can be correctly detected. For this purpose in the inventive example also the falling flanks 65 of the signal 52 are evaluated. Depending on this, for the single cylinder the injections of fuel by the injection devices 24 (reference numeral 64 in FIG. 2) and in the ignition of the fuel-air mixture by the spark plug 26 (reference numeral 66 in FIG.

2) are performed. The opening time period of the inlet valve 18 in FIG. 2 is identified with reference numeral 68.

Figure 3A:
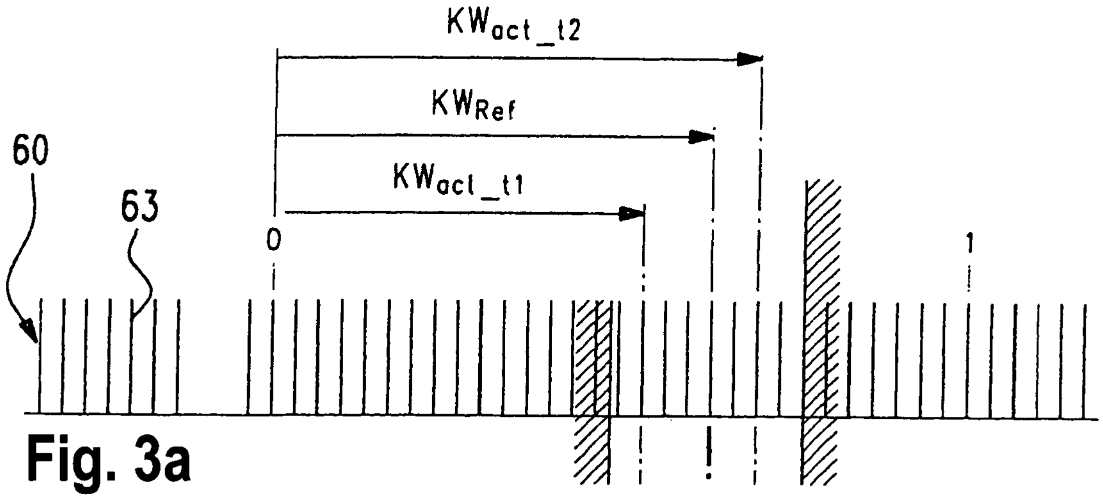
FIG. 3*a* is an enlarged section of the signal of the detecting device for the angular position of the crankshaft.
Figure 3B:
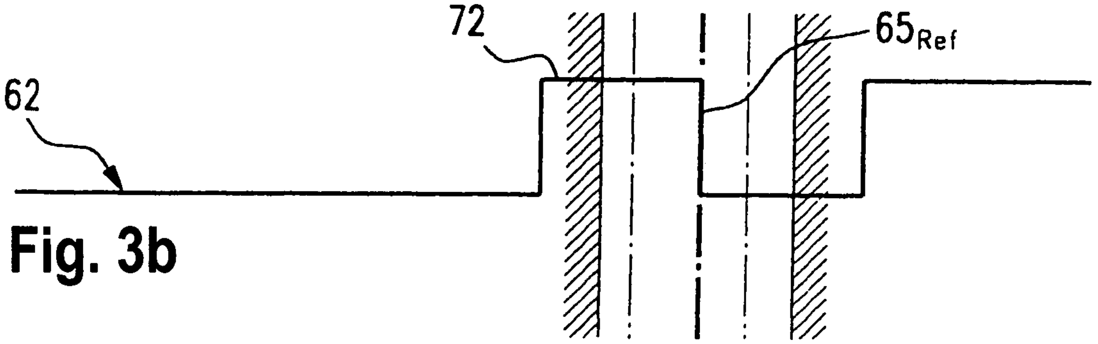
FIG. 3*b* is a corresponding enlarged cross-section of the signal of the detecting device of the angular position of a camshaft in a first operational case.

When all tolerance influences are equal to zero and the coupling between the crankshaft 32 and the camshaft 36 is error-free, a predetermined falling flank $65_{ref}$ is located between two short rectangular signals 72 of the signal 62, which represents the angular position of the camshaft 36, in this embodiment with a crank angle $KW_{Ref}$. This situation is shown in form of an increased section in FIGS. 3*a* and 3*b*.

Figure 4:
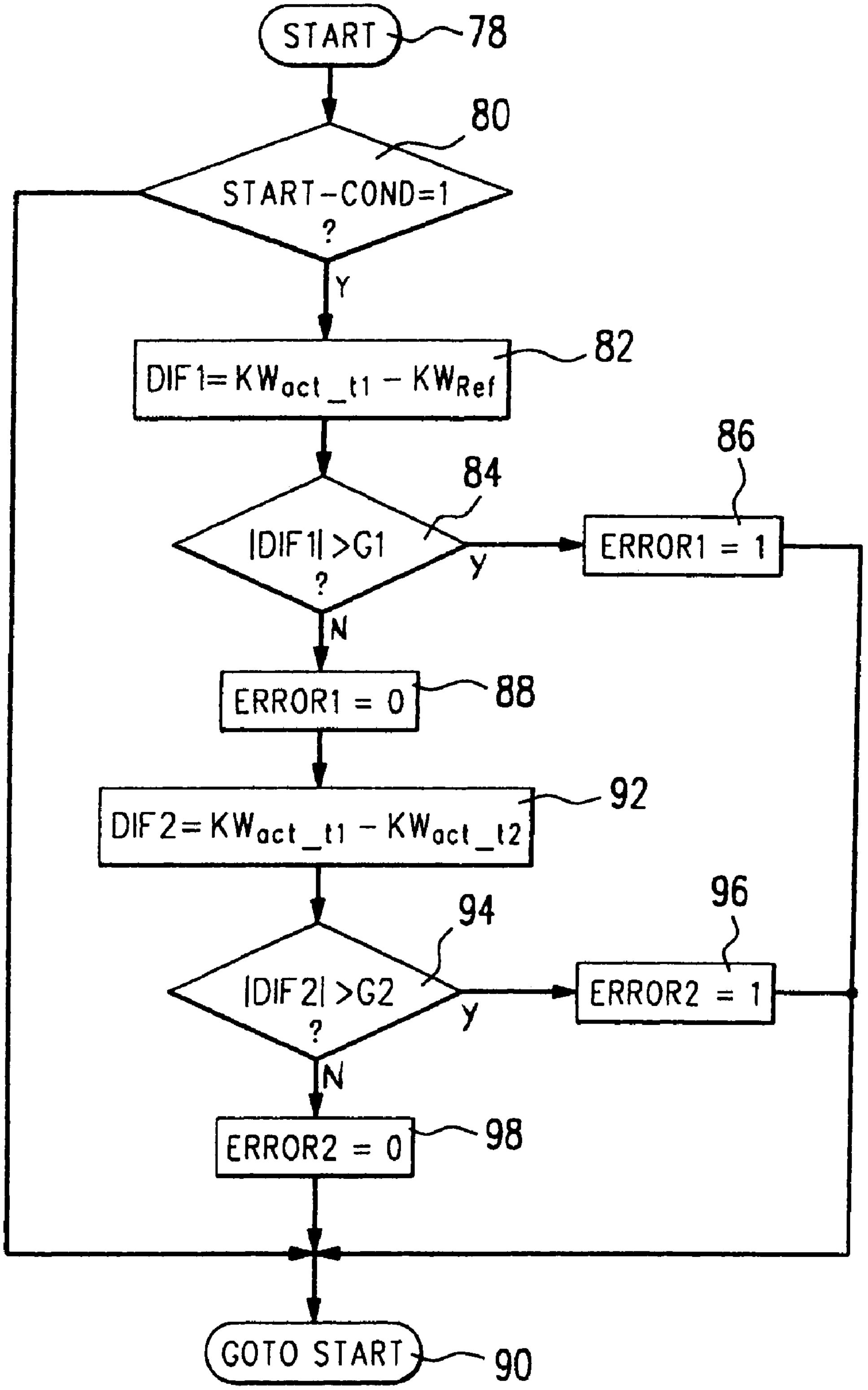
FIG. 4 is a flow diagram for illustration of a method of operation of the internal combustion engine of FIG. 1.

A desired angular position between the crankshaft 32 and the camshaft 36 is defined by this crank angle $KW_{Ref}$, or in other words a predetermined angular position of the camshaft 36 in case of a predetermined angular position of the crankshaft 32. Because of the manufacturing tolerances, of mounting errors, or because of a malfunction in operation of the internal combustion engine 10, it is possible that this angular position does not correspond to the desired value. In order to determine this, a method is proposed which is stored as a computer program in a storage 76 of the control and regulating device 48. This method is illustrated in FIG. 4. After a start block 78, a block 80 is inquired, whether the switching conditions of the internal combustion engine 10 are provided. Thereby it is guaranteed that the method described in FIG. 4 is efficiently guided to an end when the machine is started and thereby is located in a defined initial condition. This is specifically important in internal combustion engines with an adjustable angular position of the camshaft 36 relative to the crankshaft 32, to provide defined and reproducible conditions for performance of the method. For this purpose in the block 18 it is inquired whether a bit START_COND=1.

Figure 3C:
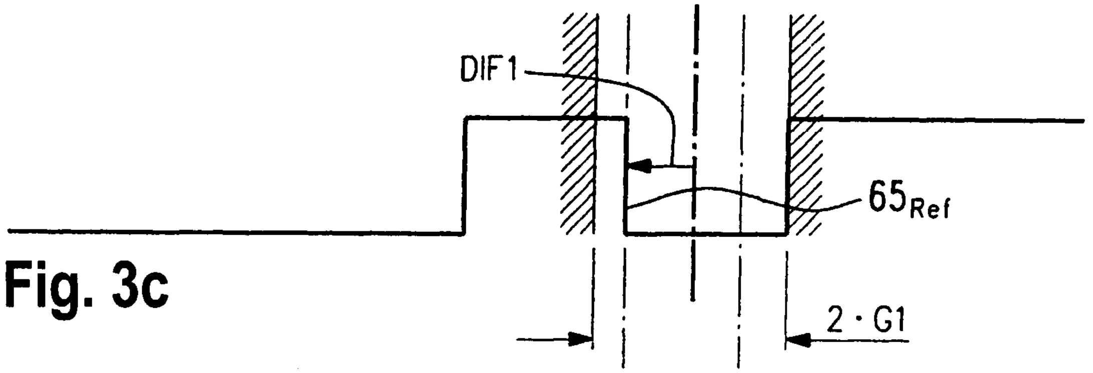
FIG. 3*c* is a view substantially similar to the view of FIG. 3*b* for a second operational case.

If the answer in the block 80 is "yes" then in the block 82 a difference DIF1 is determined between a relative angular position $KW_{art\_t1}$ and a nominal angular position $KW_{REF}$. The angular position $KW_{act\_t1}$ detected during the last operational cycle of the internal combustion 10 and stored in a non-volatile storage. Such an operational situation with DIF1 not equal to zero is shown in FIG. 3*c*. The difference DIF1 corresponds finally to the static deviation of the actual relative angular position of the camshaft 36 to the crankshaft 32 from the nominal angular position $KW_{REF}$. When the amount of the difference DIF1 exceeds a limiting value G1 (block 84), then in a block 86 an error bit ERROR 1=1 is set. Otherwise, this error bit is deleted in a block 88. If the error bit ERROR 1 is set in the block 86, in the block 90 a return to the start block 78 is performed.

Figure 3D:
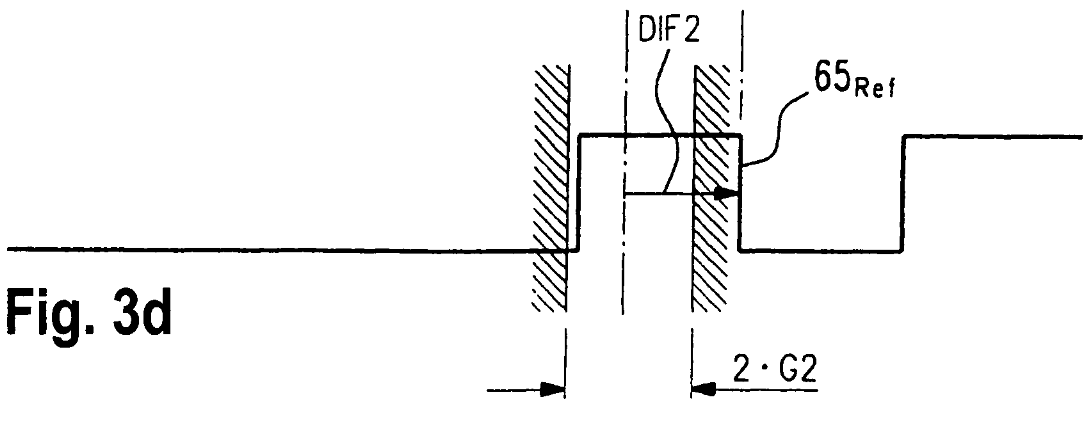
FIG. 3*d* is a view substantially corresponding to the view of FIG. 3*b* of a third operational case.

If to the contrary in the block 88 the error bit ERROR 1 is deleted, then in the block 92 a difference DIF2 between the angular position $KW_{act\text{-}t1}$ and the actual relative angular position $KW_{act\text{-}t2}$ is formed (an operational situation with DIF2 not equal zero is shown in FIG. 3*d*). The both angular positions $KW_{act\_t1}$ and $KW_{act\_t2}$ are detected at different time points t1 and t2, so that the difference DIF2 represents a time ("dynamic") change of the angular position. In a block 24 it is checked whether the amount of the difference DIF2 exceeds a limiting value G2. If the answer in the block 94 is "YES", then in the block 96 an error bit ERROR 2=1 is set. Otherwise, this error bit ERROR 2 in block 98 is set equal 0.

With the set error bit ERROR 1 a static error takes place in the coupling between the crankshaft 32 and the camshaft 36. When the error bit ERROR 2 is set, to the contrary a dynamic error function is generated. For example a sliding of the toothed belt or a tearing off of the toothed belt belongs to the situation. In order to determine moreover whether this dynamic error function is sudden or gradual, it can be detected whether the change of the DIF2 of the angular position occurs within a predetermined time window. A corresponding inquiry is performed between the blocks 94 and 96 in FIG. 4.

It should be also pointed out that at least when the difference DIF1 does not exceed the limiting value G1, the difference DIF1 is made at least approximately to zero by a corresponding adaptation of the angular position $KWa_{act\_t1}$ the nominal angular position $KW_{REF}$. In order to correctly determine the difference DIF2 the value $KWa_{act\_t1}$ as explained hereinabove is stored in a non-volatile storage. Furthermore, the adaptation is performed with a time delay by means of a low pass filter, in order to prevent that the actual relative angular position $KWa_{act\_t2}$ is also adapted to the nominal angular position $KW_{REF}$ which would make impossible the correct determination of the DIF2.

It will be understood that each of the elements described above, or two or more together, may also find a useful application in other types of constructions differing from the types described above.

While the invention has been illustrated and described as embodied in method of operating an internal combustion engine, in particular in a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of recognizing the change of the coupling of a crankshaft and a camshaft of an internal combustion engine in a motor vehicle, comprising the following steps:

determining angular positions of said crankshaft and said camshaft from signals of two detecting devices;

monitoring a relative angular position of one of the shafts relative to the other of the shafts;

providing a tolerance region of the relative position;

determining whether a change of the determined actual relative position is located outside the tolerance region;

recognizing the change of the coupling of said crankshaft and said camshaft and, without compensating the changes, releasing an action depending on whether a change of the determined actual relative position is located outside said tolerance region; and changing a desired relative position of the both shafts relative to one another; and using an actual relative position for the monitoring, wherein the actual relative position is determined in a certain position of a possible adjusting region.

2. A method as defined in claim 1; and further comprising performing the release of the action depending on whether the change is located within a predetermined parameter selected from the group consisting of a predetermined time interval, a predetermined number of revolutions, and both.

3. A method as defined in claim 1; and further comprising storing a determined actual relative position the latest at an end of an operational cycle of the internal combustion engine in a non-volatile storage.

4. A method as defined in claim 1; and further comprising using an end position as the certain position.

5. A method as defined in claim 1; and further comprising performing the release of an action depending on whether the determined actual relative angular position is located outside of a tolerance region.

6. A method as defined in claim 1; and further comprising releasing the action which includes an action selected from the group consisting of an introduction in an error storage, a stoppage of the internal combustion engine, and both.

7. A method as defined in claim 1; and further comprising adapting the determined actual relative position with respect to a nominal value; and performing the adaptation in a time-delayed manner.

8. A method as defined in claim 7, wherein said performing the adaptation in a time delayed manner includes using a low pass filter.

* * * * *